(12) United States Patent
Buchtal et al.

(10) Patent No.: US 12,129,988 B2
(45) Date of Patent: Oct. 29, 2024

(54) ILLUMINATION DEVICE AND ILLUMINATION PROCESS WITH MEASUREMENT AND DISPLAY OF THE DISTANCE

(71) Applicant: Drägerwerk AG & Co. KGaA, Lübeck (DE)

(72) Inventors: Ralf Buchtal, Lübeck (DE); Hanno Kretschmann, Lübeck (DE)

(73) Assignee: DRÄGERWERK AG & CO. KGAA, Lübeck (DE)

( * ) Notice: Subject to any disclaimer, the term of this patent is extended or adjusted under 35 U.S.C. 154(b) by 0 days.

(21) Appl. No.: 18/459,662

(22) Filed: Sep. 1, 2023

(65) Prior Publication Data

US 2024/0077189 A1 Mar. 7, 2024

(30) Foreign Application Priority Data

Sep. 5, 2022 (DE) ...................... 10 2022 122 414.7

(51) Int. Cl.
| | |
|---|---|
| *F21V 14/02* | (2006.01) |
| *F21V 21/14* | (2006.01) |
| *F21V 21/40* | (2006.01) |
| *F21W 131/205* | (2006.01) |
| *G01S 7/51* | (2006.01) |
| *G01S 17/10* | (2020.01) |

(52) U.S. Cl.
CPC ............. *F21V 14/02* (2013.01); *F21V 21/14* (2013.01); *F21V 21/40* (2013.01); *G01S 7/51* (2013.01); *G01S 17/10* (2013.01); *F21W 2131/205* (2013.01)

(58) Field of Classification Search
CPC .......... F21V 14/02; F21V 21/14; F21V 21/40; F21W 2131/205; G01S 7/51; G01S 17/10; H05B 47/115; A61B 1/06; A61B 1/0607
See application file for complete search history.

(56) References Cited

U.S. PATENT DOCUMENTS

| | | | |
|---|---|---|---|
| 9,491,835 B2 | 11/2016 | Elfring et al. | |
| 9,504,113 B2 | 11/2016 | Sattler et al. | |
| 11,484,382 B2* | 11/2022 | Hollopeter | ............. A61B 90/30 |
| 11,872,088 B2* | 1/2024 | Westenfelder, II | ..... G01S 17/88 |
| 11,994,270 B2* | 5/2024 | Salasidis | ............. F21V 23/0471 |
| 2017/0030573 A1* | 2/2017 | Alexanderson | ...... H05B 47/115 |
| 2018/0116755 A1 | 5/2018 | Hollopeter et al. | |

FOREIGN PATENT DOCUMENTS

| | | |
|---|---|---|
| DE | 102012014716 A1 | 5/2014 |
| DE | 102013012231 A1 | 1/2015 |
| DE | 102014222794 A1 | 5/2016 |
| EP | 2495487 A1 | 9/2012 |

* cited by examiner

*Primary Examiner* — Peggy A Neils
(74) *Attorney, Agent, or Firm* — McGlew and Tuttle, P.C.

(57) ABSTRACT

An illumination device (100) includes an illumination unit (1, 2) which illuminates a surface (Ob). The position and the orientation of the illumination unit (1, 2) relative to the surface (Ob) can be changed. A distance sensor (4.1, 8.2) measures an indicator of the current distance between the illumination unit (1, 2) and the surface (Ob). A signal processing control unit (10) is configured to control an output unit (6.1, 6.2) of the illumination unit (1, 2). The controlled output unit (6.1, 6.2) outputs an indication of how much the measured distance deviates from a predetermined reference distance (Ref$_1$, Ref$_2$).

14 Claims, 5 Drawing Sheets

FIG. 6

ILLUMINATION DEVICE AND ILLUMINATION PROCESS WITH MEASUREMENT AND DISPLAY OF THE DISTANCE

CROSS REFERENCE TO RELATED APPLICATIONS

This application claims the benefit of priority under 35 U.S.C. § 119 of German Application 10 2022 122 414.7, filed Sep. 5, 2022, the entire contents of which are incorporated herein by reference.

TECHNICAL FIELD

The invention relates to an illumination device (lighting device) which is adapted to illuminate a surface, to measure the distance between itself and the illuminated surface, and to output an indication of the measured distance in at least one form perceptible by a human. The invention further relates to an illumination process performed using such an illumination device.

BACKGROUND

The illumination device is used, for example, as a medical operating light (surgical light). A medical operating light is generally mounted on a ceiling so as to be freely movable and is capable of illuminating an operating table and thus a patient lying on the operating table. Typically, the position and/or orientation of the operating light can be changed relative to the illuminated operating table. Typically, various parameters can be set and changed on the operating light, in particular a specification for the illuminance achieved, the light field diameter achieved and the resulting color temperature.

As is known, the distance between the illumination device and the illuminated surface affects the effect of the illumination device on the surface.

SUMMARY

It is an object of the invention to provide an illumination device and an illumination process which are capable of illuminating a surface with a greater reliability than known illumination devices and illumination processes.

The task is solved by an illumination device having illumination device features according to the invention and by an illumination process having illumination process features according to the invention. Advantageous embodiments of the illumination device according to the invention are, as far as useful, also advantageous embodiments of the lighting process according to the invention and vice versa.

In the followings the terms difference and deviation between two numbers a and b are used. In this presentation the two numbers a and b are two distances. The difference denotes the number a-b whereas the deviation denotes the amount abs(a-b). The difference can be smaller than zero whereas the deviation is always greater than or equal to zero.

The illumination device according to the invention comprises at least one illumination unit (lighting unit), optionally at least two illumination units. The illumination unit or each illumination unit is capable of illuminating a surface, for example an operating table on which a patient is lying or can lie. Preferably, the or each illumination unit comprises a respective plurality of light sources.

The respective position and orientation of the or each illumination unit relative to the illuminated surface can be changed. In the case of multiple illumination units, preferably the position and orientation of each illumination unit can be changed independently of the position and orientation of the or each other illumination unit.

For the or each illumination unit, the illumination device comprises at least one respective distance sensor associated with the illumination unit and at least one respective output unit associated with the illumination unit. The distance sensor and/or the output unit may be physically connected to the illumination unit, for example arranged in or on a support of the illumination unit. The distance sensor and/or the output unit may also be spatially remote from the illumination unit and movable relative to the illumination unit.

The or each distance sensor of an illumination unit is capable of measuring an indicator of the distance between the associated illumination unit and the illuminated surface. Optionally, the distance sensor measures an indicator for the distance between itself and the surface, and from this measured value as well as from the geometry of the illumination unit, the sought distance is derived. This geometry is predetermined by the configuration of the illumination unit and remains unchanged in use. Optionally, the orientation of a viewing direction of the distance sensor relative to the optical center axis of the illumination unit is also used. The measure of distance may be a suitable averaging or other aggregation over time of multiple individual measured values for distance, and may be an aggregation of measured values from the same distance sensor or from different distance sensors. Preferably, the measured distance relates to an optical center axis of the illumination unit. The geometry of the illumination unit defines a constant lateral offset between the optical center axis and the distance sensor.

The illumination device further comprises a signal processing control unit. This control unit receives a signal from the or each distance sensor of the or each illumination unit and is able to control the output unit which is assigned to this illumination unit. The control depends on the measured distance between the illumination unit and the illuminated surface. The controlled output unit is capable of outputting an indication of a deviation, i.e. how much the measured distance between the illumination unit and the illuminated surface deviates from a given reference distance. In the case of a medical illumination device, this reference distance is often 1 m. The output unit outputs this indication in at least one form that can be perceived by a human, in particular visually and/or acoustically and/or haptically, in particular with vibrations.

The illumination process according to the invention is carried out using an illumination device according to the invention and comprises the following steps:

The or at least one illumination unit of the illumination device illuminates the surface continuously or at least temporarily. Preferably, each illumination unit illuminates at least temporarily the surface.

At least once, the position and/or orientation relative to the surface of the or at least one illumination unit is changed.

If an activating event (triggering event) is automatically detected, a sequence is automatically triggered, the sequence comprising the following automatically performed steps:

The or at least one distance sensor associated with this illumination unit measures an indicator of the current distance between the associated illumination unit and the illuminated surface. Preferably, the distance sensor measures the distance repeatedly, for example at a fixed sampling rate.

The output unit of this illumination unit is controlled.

The controlled output unit outputs an indication of how much the measured current distance between the illumination unit and the surface deviates from a predetermined reference distance. This indication of the deviation is output in at least one form that can be perceived by a human, in particular visually and/or acoustically and/or haptically.

Preferably the control unit is configured for performing the corresponding steps whereas these steps are triggered by the detection of an activating event.

The activating event is detected at least when at least one of the following events is detected:

The illumination device is moved or touched. In particular, the position and/or orientation of the illumination device relative to the illuminated surface is changed.

The illuminated surface is moved. For example, an illuminated operating table or other illuminated object is moved. The movement of the illuminated surface is detected at least when this movement changes the distance between the illuminated surface and the illumination unit.

An actuating element (operating element) of the illumination device is actuated. This actuating element is, for example, a part of a handle with which a user can change the position and/or orientation of the or an illumination unit, a part of an input unit with which a user can enter a specification for the illumination device, or a special actuating element with which a user can trigger the sequence just described.

The control unit detects that the deviation between the measured current distance and the given reference distance is significant or changes rapidly. "Significant distance" means: The deviation is outside a specified tolerance range (tolerance band) around zero. "Rapid change" means: The change in the deviation per unit of time is outside a specified change tolerance range.

It is also possible that the sequence is performed independently of an activating event, for example, it is performed repeatedly on a regular basis.

Usually, a user or a high-level control system is able to specify or preset a value for at least one parameter of an illumination unit or of the entire illumination device. Typically this value refers to the reference distance. In the case of an illumination unit for a medical purpose, the parameter or a parameter is, for example, the maximum illuminance achieved or to be achieved at the reference distance or in space. The parameter can also be the light field diameter $d_x$ or also the color temperature correlated with a light spectrum of the illumination unit wherein the light field diameter $d_x$ or the color temperature also refer to the reference distance. it is also possible that for a parameter, in particular for the irradiance, an upper threshold is given wherein this upper threshold refers to the parameter value in the reference distance.

A number of terms are explained and used below. These terms apply, as appropriate, to the entire illumination device, to the or each illumination unit, and to each light source of an illumination unit.

Illuminance" (Ev) describes the luminous flux per unit area incident on a surface. The SI unit is Lux=Lumen/m^2. On a plane perpendicular to the optical center axis of an illumination unit, the illuminance often takes the maximum value at the intersection of the optical center axis with this plane, sometimes also in a circle around this intersection. In general, the maximum illuminance that an illumination unit achieves on an illuminated surface depends on the distance between the illumination unit and the surface. As a rule, this maximum value varies along the optical center axis, as follows: Starting from the illumination unit, this maximum value increases until it reaches a maximum, and then decreases again. The value at this maximum is called the maximum illuminance in space of the illumination unit. As a rule, the maximum illuminance in space occurs on the optical center axis. The area in which the illuminance takes its maximum value can be positioned on the illuminated surface or between the surface and the illumination unit. If the surface were transparent and if the distance is small enough the area where the maximum value could also be behind the illuminated surface seen in the radiation direction.

The configuration of the illumination unit determines a maximum illuminance that can be achieved in space. Often, an illumination unit is configured so that the maximum achievable illuminance in space occurs at a predetermined reference distance from the illumination unit. Frequently, this reference distance is 1 m.

The light field generated by an illumination unit on an illuminated surface is the spatially varying illuminance on the surface. The light field thus assigns an illuminance to each point on the surface. In many cases, a three-dimensional representation of the light field takes the form of a bell curve that is rotationally symmetric about the optical center axis of the illumination unit. A flat illuminated surface extends in the x-y plane of this three-dimensional representation, and the illuminance is plotted on the z-axis. The light field then often has the shape of a bell curve, which is ideally rotationally symmetrical to the z-axis.

The light field diameter $d_x$ is the diameter of a circle on which the average illuminance is still x % of the maximum illuminance achieved by the illumination unit on the illuminated surface. This circle extends in a plane perpendicular to the optical center axis. The mean illuminance on a circle is preferably an average value over the respective illuminance at several points on this circle. For example, the points are evenly distributed on the circle. The light field diameter $d_x$ depends on the distance between the illumination unit and the illuminated plane. Therefore, the light field diameter $d_x$ is often referred to the above-mentioned reference distance of e.g. 1 m. Typical values for x in the medical field are 10% and 50%. For an operating light, $d_{10}$ is often between 13 cm and 35 cm.

The parameters typically refer to a given reference distance of, for example, 1 m. The distance between the illumination unit and the surface determines to a relatively large extent the maximum illuminance and the light field diameter $d_x$ on the illuminated surface, especially if this distance lies outside a given tolerance range around the reference distance. Therefore, specifications for the maximum illuminance and the light field diameter often refer to the reference distance. If the actual distance significantly deviates from the reference distance, the value obtained for the maximum illuminance or for the light field diameter often deviates significantly from the respective specified value. This can be acceptable or undesirable.

According to the invention, an indication of how much the measured actual (current) distance deviates from the given reference distance is output in at least one form that can be perceived by a human. This feature makes it easier for a user to perceive this deviation and, if necessary, to change the position of the illumination unit relative to the surface, thereby changing the distance. Because an indication for the deviation between the actual distance and the reference distance is output, the user does not need to know or perceive or estimate or even measure the reference distance or the actual distance. Rather, the user can move the illumination unit relative to the illuminated surface on a trial basis, repeatedly if necessary, and thereby "approach" the reference distance or tolerance range.

According to the invention, the current actual distance between the or an illumination unit and the illuminated surface is measured. The indication for the deviation between the measured actual distance and the given reference distance is output on or with the or at least one output unit associated with the illumination unit in question. If the illumination device comprises a plurality of illumination units, it preferably also comprises a plurality of output units. If the illumination device comprises a plurality of illumination units, it is usually clear to which illumination unit an indication output on a particular output unit relates because of the assignment of an output unit to an illumination unit.

The invention can be used in combination with an actuator for the illumination unit. However, in many cases, the invention eliminates the need to provide such an actuator as well as an actuating element for an actuator. Often, a user is accustomed to manually positioning and orienting the illumination unit. Nevertheless, the invention makes it easier for a user to position an illumination unit approximately in the reference distance.

It is possible that the deviation between the measured distance and the reference distance is output as a numerical value. In a preferred embodiment, however, the deviation is output visually using different symbols. This embodiment allows a user to quickly grasp a rough measure of the deviation without having to process or evaluate a numerical value in their head. For example, one symbol means that the deviation is within a predetermined tolerance range around zero, and at least one other symbol means that the deviation is outside this tolerance range.

In one implementation, the output unit of an illumination unit comprises a display unit that comprises a display surface. The indication is output on this display surface. This implementation leads to the feature that the indication can be perceived independently of the profile or color or brightness of an illuminated surface, which feature leads in many cases to an ergonomic output of the indication. In the case of an operating light illuminating a patient on the operating table, the indication can be output in such a way that the patient does not perceive the indication, which in many cases also increases safety.

In another implementation, the display unit comprises at least one light source of an illumination unit. The indication is thus output on the illuminated surface itself. In many cases, this form of realization makes it easier for a person to perceive the indication without having to take his or her eyes off the illuminated surface.

In one embodiment, the or at least one output unit comprises three output elements that are spatially spaced apart from each other and/or differ from each other graphically and/or by the type of visual display, namely a first output element, at least one second output element, and at least one third output element. These output elements all relate to the same illumination unit. Preferably, these at least three output elements are arranged side by side or also one above the other on a display surface of the output unit, i.e. are display elements. Particularly preferably, the output unit is mechanically connected to the illumination unit, for example mounted on a support (carrier) of the illumination unit. It is also possible that at least three different light sources of the illumination unit function as output elements.

The controlled output unit highlights a first output element when the difference between the measured current distance and the given reference distance is in a given tolerance range around zero. It highlights at least one second output element when the difference is greater than the upper threshold of the tolerance range, i.e. the measured distance is significantly greater than the reference distance, and a third output element when the difference is less than the lower threshold of the tolerance range, i.e. the measured distance is significantly less than the reference distance. This embodiment allows a user to quickly determine whether the distance is approximately equal to the reference distance or should be increased or decreased to achieve the reference distance. A user can change the distance between the illumination unit and the surface on a trial basis and perceive the resulting response on the output elements.

In one implementation of this embodiment, the illumination device comprises a first illumination unit and a second illumination unit. Preferably every illumination unit can be moved and positioned independently from the or every other illumination unit. Every illumination unit is configured to achieve a maximum irradiance. The maximum irradiance of the first illumination unit is greater than the maximum irradiance of the second illumination unit. It is possible that the same tolerance range is given for both illuminations units. In an alternative implementation the tolerance range which is given for the first illumination unit is smaller than the tolerance range which is given for the second illumination unit. One background: As a rule, the first illumination unit achieves on the illuminated surface larger maximum irradiance than the second illumination unit. Therefore it is more important that the first illumination unit has approximately the reference distance to the illuminated surface then the second illumination unit.

In one embodiment the or at least one output unit comprises a first output element as well as two second output elements and two third output elements. These five output elements can be five different display elements on the just mentioned display surface of the output unit. They may also be realized by means of five different light sources of the illumination unit.

The controlled output unit highlights the first output element when the difference between the measured distance and the reference distance is within a given first tolerance range around zero. The controlled output unit highlights a second output element when the difference is greater than the upper threshold of the first tolerance range, and a third output element when the difference is less than the lower threshold. According to the implementation of the embodiment, the controlled output unit highlights another second output element when one of the following events has occurred:

The difference becomes even larger, so it is increasing and moves away from the first tolerance range.
The difference becomes smaller (is decreasing) and moves towards the first tolerance range.
The difference is even greater than the upper threshold of a given further tolerance range. This further tolerance range completely encompasses (comprises) the first tolerance range around zero, i.e. it is in both directions wider than the first tolerance range.

In one implementation, the output unit highlights either the one or the other second output element depending on how large the difference is or how the difference changes. In another implementation, the output unit highlights the other second output element in addition to the one second output element when the corresponding condition has occurred.

Thus, in one embodiment, if the difference between the measured current distance and the reference distance is greater than the upper threshold of the first (narrower) tolerance range, the output unit highlights one or the other second output element depending on how much the difference is above (greater than) the tolerance range. This embodiment makes it easier for a user to see whether the distance needs to be reduced more or less, and allows the user to more quickly arrive at a distance that is within the predetermined narrower tolerance range.

In one implementation, the output unit thus highlights the one second output element if the difference is outside the first (narrower) tolerance range but still within the wider tolerance range. It highlights the other second output element if the difference is even outside the wider tolerance range. In a deviating implementation, the output unit highlights the other second display element if the deviation is outside the first tolerance range and is even increasing.

Accordingly, the output unit highlights one or the other third display element depending on how far the difference is below the tolerance range. More precisely, according to the further development, the controlled output unit highlights another third output element when one of the following events has occurred:

The difference is even decreasing, thus moving further away from the tolerance range.
The difference is increasing and moves towards the first tolerance range.
The difference is even smaller than the lower threshold of the wider tolerance range.

Again, in one embodiment, the output unit highlights the one third output element and additionally highlights the other third output element when the respective conditions have occurred. In another implementation, the output unit highlights either the one or the other third output element It is possible that the output unit even comprises three second and/or three third output elements. Two of these output elements each relate to the first (narrower) tolerance range, to the wider tolerance range and to the change in the difference over time. The at least three output elements can in particular be display elements on a display surface or also individual light sources of the illumination unit, which change in a visually perceptible manner depending on the control, for example assume a different color or a different brightness.

In one embodiment, the illumination device comprises two illumination units. Preferably, each illumination unit comprises multiple light sources. Each illumination unit is capable of illuminating the surface. The position and orientation of one illumination unit relative to the or every other illumination unit can be changed. This makes it possible to illuminate the illuminated surface from at least two different directions, which reduces the risk that an area of the surface is only slightly illuminated or even not illuminated at all. A respective output unit is associated with each of the two illumination units. This output unit is mechanically connected to the illumination unit. Thanks to this mechanical connection, the position and orientation of the associated output unit remains constant relative to the illumination unit. This configuration makes it easier to assign a visually perceptible output on the output unit to the correct illumination unit, i.e. the one to which this display relates.

In one implementation, each illumination unit comprises a respective support (carrier). The light sources of the illumination unit are mounted in or on this support. The output unit is also mounted on this support.

In one embodiment, a distance sensor is capable of scanning the illuminated surface in a contactless manner. For example, multiple radiation sources of the distance sensor that are spaced apart emit electromagnetic waves or sound waves toward the surface, the surface reflects these waves, and the respective travel time (time-of-flight) from a radiation source to the surface and back to the radiation source or to a separate receiver and/or the attenuation of the radiated energy are measured. In one implementation, the non-contact scanning provides a topographic profile of the illuminated surface, preferably a 3D profile. This topographic profile may change over time, in particular because the position and/or orientation of the illumination unit relative to the illuminated surface is changed or
because the illuminated surface itself is moving, for example because a patient on an operating table is moving or the operating table together with the patient is moving.

Preferably, due to the configuration and geometry of the illumination unit, the current position of the optical center axis of the illumination unit relative to the generated topographic profile is known. By evaluating the topographic profile, the control unit is able to automatically determine the distance between the illumination unit and the illuminated surface along the optical center axis or also a distance that is averaged over an area of the surface.

It is possible for an object to get into the area between the illumination unit and the illuminated surface. If the illuminated surface belongs to a patient on an operating table, this object is, for example, a body part of an attending physician or other person and/or a medical instrument. The evaluation of a topographic profile makes it easier to measure the distance between the illumination unit and the surface with sufficient reliability despite this event. In particular, the risk that the distance between the illumination unit and the object is incorrectly used as the distance between the illumination unit and the illuminated surface is reduced.

In one embodiment, the control unit detects the contour of the object in the area between the illumination unit and the surface in the topographic profile and does not take into account the area of the topographic profile bounded by this contour when measuring the distance between the illumination unit and the illuminated surface. It is also possible that the control unit, by evaluating the profile, detects that an object has entered the area between the illumination unit and the surface. In response to this detection, the control unit uses readings taken prior to the detection to measure the distance. In many cases, when an object enters the area between the illumination unit and the illuminated surface, the distance between the illumination unit and the illuminated surface remains constant.

Preferred embodiments of the inventions allow a human to perceive the indication for deviation without taking his or her eyes off an area of the illuminated surface. This is advantageous, for example, when a physician is performing a medical operation and the illumination unit illuminates the area of the patient's body where that operation is being performed.

In one embodiment, an indication of the deviation is output by an acoustic signal. The acoustic signal may depend on the magnitude of the deviation. The acoustic signal can also depend on whether the measured distance is larger or smaller than the reference distance, i.e. on the difference.

In another embodiment, the identification is output by a haptic signal, in particular by a vibration. For example, an actuating element which a user actuates vibrates, in particular an actuating element with the aid of which a user changes the position and/or orientation of the or an illumination unit. The actuating element is in particular a handle, which is arranged at the illumination unit and preferably points towards the illuminated surface but may also point away from the illuminated surface. Because the user touches this actuating element anyway to move the illumination unit, there is little risk that he or she will fail to notice the vibrations. In many cases, moreover, actuation of the actuating element causes the distance to be changed and the indication to be output in response thereto. Thus, the or an output unit associated with an illumination unit is integrated into the or a handle of the illumination unit. This embodiment makes it easier for a user to use the handle to move the illumination unit so that the deviation between the measured distance and the reference distance is within a given tolerance range.

In another possible embodiment, the illumination unit itself comprises the output unit that outputs the indication in a visual form without necessarily using a separate output unit for this purpose. The indication is then visible on the illuminated surface itself. This embodiment saves a user from having to look alternately at an illuminated area, such as a patient, and at a display unit or other separate output unit, and from having to frequently change the view direction. Rather, because the illumination unit itself comprises the output unit and visually outputs the indication, a user can perceive the output while looking at the illuminated area.

According to this embodiment, the illumination achieved by the illumination unit depends on whether the deviation is within the tolerance range or outside the tolerance range. Preferably, the illumination unit comprises several light sources that are capable of illuminating the surface. In one implementation, these light sources can only be moved together.

The state of at least one light source depends on whether the deviation between the measured distance and the reference distance is in the tolerance range or outside the tolerance range. If the deviation is in the tolerance range, the light source has a first state, otherwise at least a second state. Both states and also the difference between the first and the second state can be visually perceived by a human. Usually, these differences are visible on the illuminated surface. The aforementioned control device is capable of controlling at least a first group of light sources and a second group of light sources independently of each other.

In particular, the following embodiments are possible for transferring a light source in different states:
   In the first state, the light source is continuously illuminated; in the second state, it flashes. More precisely, a human perceives the light source as continuously illuminated in the first state, and as blinking in the second state. It is possible that the light source is pulsed in both states, with the pulse frequency in the first state being so high that the human perceives a continuously illuminated light source.
   The light source is perceived by a human as blinking in both states. The frequency of the flashing is perceptibly greater in the second state than in the first state.
   The maximum illuminance of the light source in the second state is greater than that in the first state.
   In the second state, a light field diameter $d_x$ of the light source is different, preferably larger, than in the first state.
   In the second state, the light source has a perceptibly different correlated color temperature or even light color or light spectrum than in the first state.

For example, at least one light source, as the output unit, flashes if and only if the deviation is outside the tolerance range.

The following embodiment of the invention can be combined with the embodiments just described. Preferably, the or at least one indication for the deviation is not output continuously, but in response to an activating event. The indication is output for at least a time period of a predetermined duration, which time period begins with the detection of the activating event. If no further activating event is detected within this time period, the output of the indication is terminated at the end of the time period. Preferably, the output of the indication is continued if another activating event is detected in the time period. The configuration with the time period results in the danger that too many stimuli flow in on a user at the same time.

The activating event is preferably at least one of the following events:
   The illumination unit is moved to change its position and/or orientation relative to the illuminated surface. This event is detected, for example, by a sensor on an actuating element, in particular on a handle, detecting contact with the actuating element.
   The illumination unit is touched, preferably in or on a touch-sensitive element. For example, a user specifies a value for a parameter of the illumination device or the illumination unit, e.g. using a slider or a plus and a minus button.
   The distance sensor repeatedly measures the distance between the illumination unit and the illuminated surface and detects the event that the distance has changed more than a predetermined change threshold.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Referring to the drawings, in the embodiment example, the invention is used for illuminating an object Obj in the form of an operating table. On this operating table Obj a patient, not shown, lies who is being medically treated. The illumination device 100 according to the invention illuminates that surface Ob of the operating table Obj and/or of the patient on the operating table Obj wherein the illuminated surface faces the illumination device 100. The illumination device 100 generates a light field on the illuminated surface Ob. In subsequent figures, a flat surface Ob is shown for simplicity. Of course, the illuminated surface of a patient on the operating table Obj is not flat.

Figure 1:
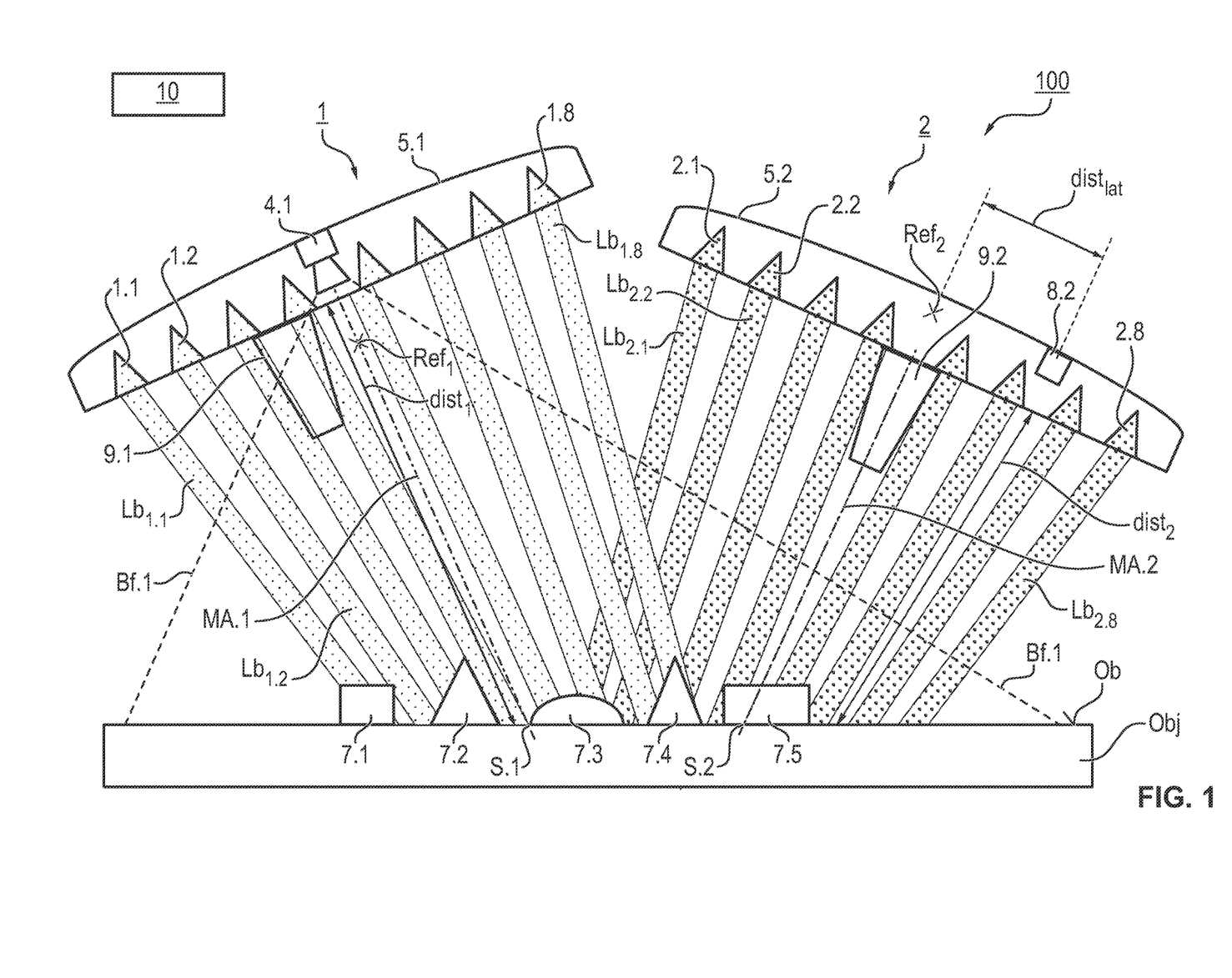
FIG. 1 is a schematic cross-sectional view of an illumination device with two illumination units and one distance sensor and one display unit per illumination unit.

The illumination device 100 of the embodiment comprises several illumination units which illuminate the operating table Obj vertically or obliquely from above and from several directions. FIG. 1 shows exemplarily and schematically two illumination units 1, 2 of the illumination device 100. Of course, another number of illumination units is also possible.

In the embodiment, the illumination units 1, 2 are movably attached to a ceiling and can be moved independently of each other. The respective position and orientation in space of each illumination unit 1, 2 can be changed, and preferably independently of the position and orientation of the illumination unit or each other illumination unit 1, 2. In one embodiment, joints (hinges) of each illumination unit 1, 2 are configured such that the illumination unit 1, 2 does not change its position and orientation by itself, but only after a user intervention. In another embodiment, each illumination unit 1, 2 can be locked and unlocked in a desired position and orientation.

Figure 2:
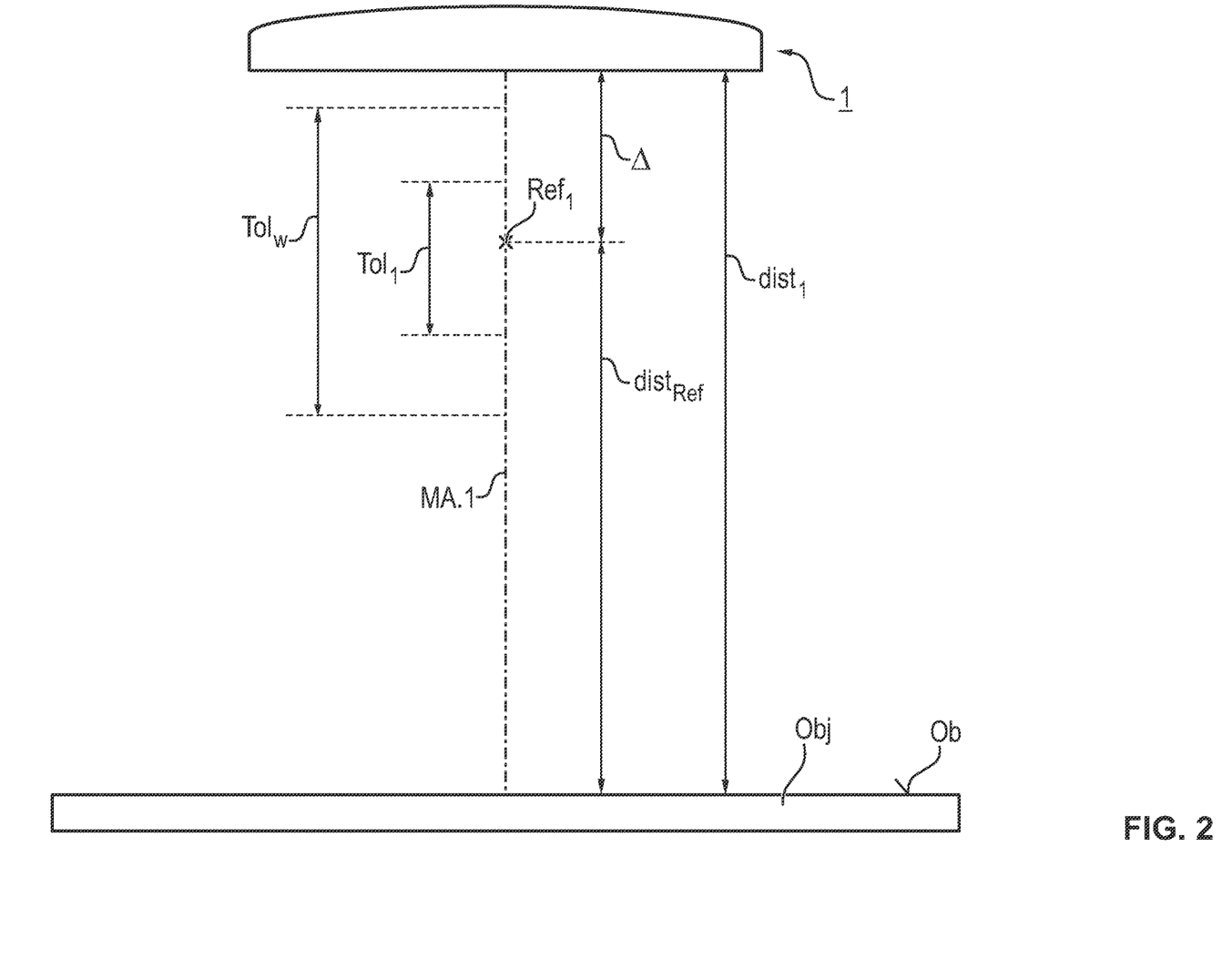
FIG. 2 schematically shows a measured current distance, a reference distance and two tolerance ranges.

FIG. 2 illustrates the reference distance. The figure is not necessarily true to scale. FIG. 2 shows the illumination unit 1, its optical center axis MA.1 and the illuminated surface Ob of the object Obj. The point $Ref_1$ on the center axis MA.1 has a reference distance $dist_{Ref}$ from the illuminated surface Ob. The point $Ref_1$ would be on that surface of the illumination unit 1 which faces to the surface Ob if the distance $dist_1$ between the illumination unit 1 and the illuminated surface Ob were equal to the reference distance $dist_{Ref}$. The measured current distance $dist_1$, however, is greater. In addition the deviation A between the measured current distance $dist_1$ and the reference distance $dist_{Ref}$ is shown. Furthermore a first, narrower tolerance range $Tol_1$ and a further, wider tolerance range $Tol_w$ are shown. The first tolerance range $Tol_1$ is completely comprised in the wider tolerance range $Tol_w$. The meaning of the tolerance ranges are explained below.

Various variable parameters affect the particular light field that an illumination unit 1, 2 generates on the illuminated surface Ob. These parameters include:
  the maximum illuminance achieved at the reference distance $dist_{Ref}$ or in space,
  the light field diameter $d_x$,
  the color temperature correlated with the light spectrum of the illumination unit 1, 2, and
  the position and orientation of the illumination unit 1, 2, relative to the illuminated surface Ob and thus the current distance $dist_1$, $dist_2$ between the illumination unit 1, 2 and the surface Ob.

The parameters "maximum illuminance achieved" and "light field diameter $d_x$" have been explained above.

A user can specify values for the first three parameters just mentioned, for example at an input unit with knobs (buttons), with rotary controls and/or with at least one touch-sensitive screen (touchscreen). In particular, a user can reduce the maximum achieved illuminance in space or at the reference distance $dist_{Ref}$ relative to the maximum achievable illuminance and thereby dim or also turn up the illumination unit 1, 2. Furthermore, the user can change the position and orientation of the illumination unit 1, 2 relative to the surface Ob, preferably by a manual intervention.

As mentioned above, a user can position and orient each illumination unit 1, 2 independently of the or each other illumination unit 2, 1 in space, in particular at a respective desired distance from the surface Ob. If the actual distance $dist_1$, $dist_2$ between an illumination unit 1, 2 and the surface Ob deviates significantly from the reference distance $dist_{Ref}$, the actual value of a parameter of the light field achieved by an illumination unit 1, 2 on the surface Ob may also deviate significantly from a desired value for this parameter. Therefore, the respective actual current distance $dist_1$, $dist_2$ between an illumination unit 1, 2 is measured without contact, and an indication for the deviation between the actual measured distance $dist_1$, $dist_2$ and the reference distance $dist_{Ref}$ is output in a form that can be perceived by a human.

In FIG. 1 a point $Ref_1$ on the optical center axis MA.1 is shown wherein the distance between the point $Ref_1$ and the illuminated surface Ob, measured along the optical center axis MA.1, is equal to the reference distance $dist_{Ref}$. Accordingly a point $Ref_2$ on the optical center axis is shown wherein the distance between the point $Ref_2$ and the surface Ob is equal to the reference distance $dist_{Ref}$.

In the embodiment example, the first illumination unit 1 is rotationally symmetrical to a center axis MA.1, and the second illumination unit 2 is rotationally symmetrical to a center axis MA.2. In the exemplary situation shown, the two center axes MA.1 and MA.2 are oblique on the illuminated surface Ob and lie in the drawing plane of FIG. 1. Each illumination unit 1, 2 and thus each center axis MA.1, MA.2 can also be positioned differently relative to the surface Ob.

The illumination units 1, 2 each have an optical center axis. In the embodiment example, the optical center axis of the illumination unit 1 is equal to the geometric center axis MA.1, and the optical center axis of the illumination unit 2 is equal to the geometric center axis MA.2. Along the optical center axis MA.1, MA.2, the illuminance and the irradiance are maximum. More precisely, in a plane perpendicular to the optical center axis MA.1, MA.2, the illuminance and the irradiance take their maximum values at the intersection of the plane with the optical center axis MA.1, MA.2. FIG. 1 shows the intersection points S.1 and S.2 of the two optical center axes MA.1 and MA.2 with the illuminated surface Ob.

The first illumination unit 1 comprises a support (carrier) 5.1 and several individual light sources 1.1, 1.2, . . . , which are fixed to the support 5.1 and are preferably arranged rotationally symmetrically about the center axis MA.1, cf. FIG. 1. A handle 9.1 is mounted on the support 5.1, namely with a lateral offset from the geometric center axis MA.1. The second illumination unit 2 comprises a support 5.2 and a plurality of individual light sources 2.1, 2.2, . . . , which are fixed to the support 5.2 and are preferably arranged rotationally symmetrically about the center axis MA.2. A handle 9.2 is mounted centered on the support 5.2. FIG. 1 shows schematically the light beams $Lb_{1.1}$, $Lb_{1.2}$, . . . of the light sources 1.1, 1.2, . . . as well as the light beams $Lb_{2.1}$, $Lf_{2.2}$, . . . of the light sources 2.1, 2.2, . . . . For illustration these light beams are dotted differently. The light sources 1.1, 1.2, . . . , 2.1, 2.2, . . . can emit light of the same color temperature or light of different color temperatures.

As already explained, the respective current distance $dist_1$, $dist_2$ between an illumination unit 1, 2 and the surface Ob is measured without contact. Different measurement processes to measure a distance are possible, for example a time-of-flight (transit time, runtime) measurement for electromagnetic radiation, in particular infrared radiation, ultrasonic radiation, radar, laser, a measurement of how much the radiation intensity is attenuated, as well as optical processes. By way of example, some principles of distance sensors that can be used for the invention are described below.

In the embodiment example, a first distance sensor 4.1, which is connected to the first illumination unit 1 and is configured as a camera, is able to measure the distance $dist_1$ between itself and the illuminated surface Ob. A second distance sensor 8.2, which is connected to the second illumination unit 2, is able to measure the distance $dist_2$ between itself and the illuminated surface Ob. A signal-processing control unit 10 receives a signal from each of the two distance sensors 4.1 and 8.2. The control unit 10 captures the lateral offset $dist_{lat}$ between the distance sensor 4.1, 8.2 and the optical center axis MA.1, MA.2 of the associated illumination unit 1, 2. This lateral offset $dist_{lat}$ is predetermined by the configuration of the illumination unit 1, 2 and is not variable during operation. In FIG. 1, this lateral offset $dist_{lat}$ is shown exaggerated. The distance sensor 4.1 is centered. Different possible configurations of the distance sensors are described below by way of example.

A camera 4.1 is attached to the support 5.1 of the first illumination unit 1, which acts as a distance sensor. The camera 4.1 cannot move relative to the support 5.1 and therefore cannot move relative to the light sources 1.1, 1.2, . . . . A distance sensor 8.2 is attached to the support 5.2 of the second illumination unit 2. The distance sensor 8.2 cannot move relative to the support 5.2 and therefore also cannot move relative to the light sources 2.1, 2.2, . . . . In the example shown, the camera 4.1 is located on or near the optical center axis MA.1, while a larger lateral offset $dist_{lat}$ occurs between the distance sensor 8.2 and the optical center axis MA.2. In the example shown, the handle 9.1 is positioned with a lateral offset from the optical center axis MA.1. It is also possible that the handle 9.1 is positioned centered and the camera 4.1 is integrated into the handle 9.1. Accordingly, the distance sensor 8.2 can be integrated in the handle 9.2.

The camera 4.1 has an autofocus function and automatically focuses on the illuminated surface Ob. The control unit 10 detects the distance at which the autofocus function has focused the camera 4.1. This distance is an estimate of the sought distance $dist_1$ between the first illumination unit 1 and the surface Ob, and measured along the optical center axis MA.1. In one embodiment, the sought distance $dist_1$ is derived from the estimated distance and the lateral distance between the camera 4.1 and the optical center axis MA.1.

The distance sensor 8.2 emits electromagnetic radiation or also sound waves towards the surface Ob. The surface Ob reflects this electromagnetic radiation or these sound waves, and a part of it reaches the distance sensor 8.2 again. The distance sensor 8.2 measures the transit time and derives an estimate for the distance $dist_2$ between itself and the surface Ob from it. The control unit 10 uses this estimate for as well as the invariant lateral offset $dist_{lat}$ between MA.2 and 8.2 to determine the distance $dist_2$ between the illumination unit 2 and the surface Ob along the center axis MA.2.

As a rule, the illuminated surface Ob does not have a flat contour. As an example, five elevations 7.1, . . . , 7.5 are shown in FIG. 1 and FIG. 4.

Figure 4:
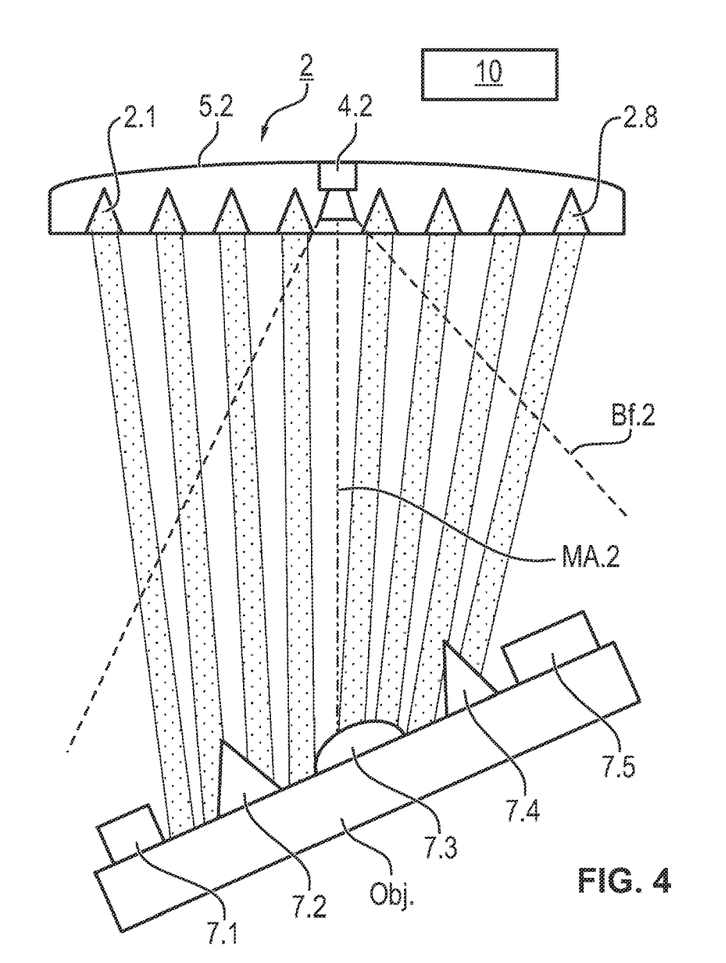
FIG. 4 is a schematic view showing how a camera scans an illuminated surface.

FIG. 4 shows a different configuration. As shown in FIG. 1, a first camera 4.1 is attached to the support 5.1, whereas a second camera 4.2 is attached to the support 5.2, which camera takes the place of the distance sensor 8.2. Each camera 4.1, 4.2 is configured as a time-of-flight sensor and is capable on the one hand of generating an image of the surface Ob and on the other hand of scanning the surface Ob without contact. A topographic 3D profile is generated with the aid of a signal from the camera 4.1. Such a time-of-flight sensor is described, for example, in DE 10 2013 012 231 A1 (corresponding U.S. Pat. No. 9,491,835 (B2) is incorporated by reference) and in DE 10 2012 014 716 A1 (corresponding U.S. Pat. No. 9,504,113 (B2) is incorporated by reference). In order to generate the topographic profile, the camera 4.1, 4.2 emits electromagnetic beams which impinge on different points of the surface Ob and are reflected there. From the respective transit time of each ray, the camera 4.1, 4.2 derives the distance to the reflecting point on the surface Ob, and from the distances the camera 4.1, 4.2 generates the respective topographic profile. The camera 4.1, 4.2 thus scans the surface Ob with the five elevations 7.1, . . . , 7.5 without contact.

Figure 5A:
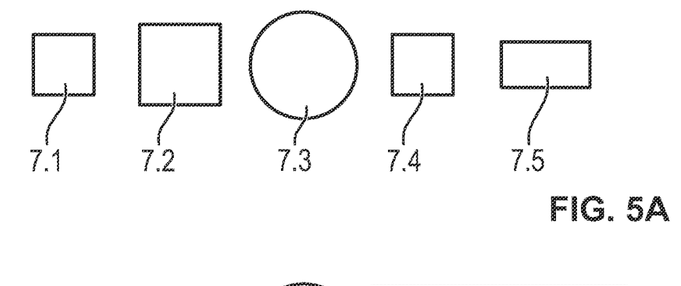
FIG. 5A is a schematic view showing an image from one of three different viewing directions from the same illuminated surface of FIG. 4.
Figure 5B:
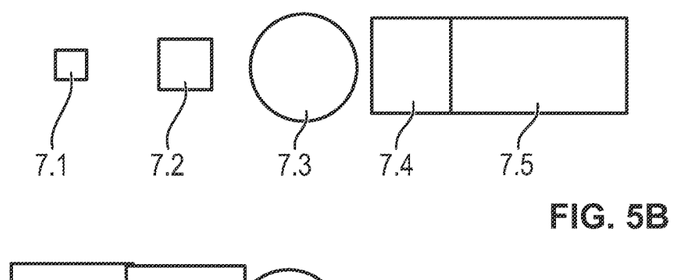
FIG. 5B is a schematic view showing an image from another of three different viewing directions from the same illuminated surface of FIG. 4.
Figure 5C:
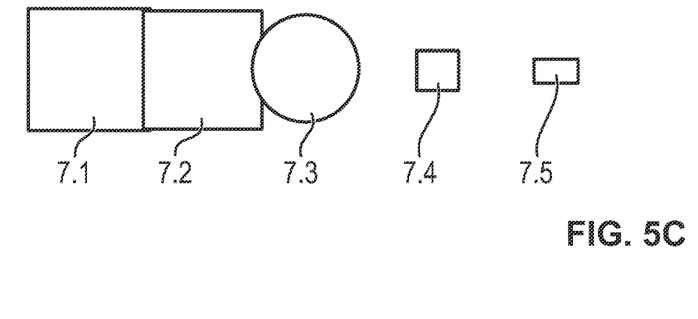
FIG. 5C is a schematic view showing an image from another of three different viewing directions from the same illuminated surface of FIG. 4.

FIG. 4 illustrates how the camera 4.2 is positioned on the second illumination unit 2 relative to the surface Ob. FIG. 5 A shows the five elevations 7.1, . . . , 7.5 are shown in a topographic profile when the optical axis of the camera 4.2 is perpendicular to the illuminated surface Ob, which is not the case for the two cameras 4.1 and 4.2 of FIG. 1, FIG. 3, and FIG. 4. FIG. 5 B shows how the five elevations 7.1, . . . , 7.5 are shown in a topographic profile of the camera 4.2 on the support 3.2 of the second illumination unit 2. FIG. 5 C shows how the five elevations 7.1, . . . , 7.5 are represented in a topographic profile of the camera 4.2. As is known, the closer an elevation 7.1, . . . , 7.5 is to the respective camera 4.1, 4.2, the larger it is displayed.

It is possible that an object, for example a body part of a human or a medical instrument, gets into the area between an illumination unit 1, 2 and the illuminated surface Ob. This event is distinguished from the event that the illumination device 100 is moved to a different position relative to the surface Ob during an operation, for example, in one of the following ways:

It is detected that the measured topographic profile changes abruptly—this can only be caused by an object entering the area between the illumination device 100 and the illuminated surface Ob.

The topographic profile differs significantly from the profile of a patient on the operating table Obj.

A given object, for example a hand or a medical instrument, is recognized.

In one embodiment, the distance used is the distance that was last measured before the event that an object entered the area was detected, or averages are taken over several last measured values of the distance. If the object enters the area between the illumination unit 1, 2 and the surface Ob in such a way that the object interrupts the optical center axis MA.1, MA.2, the distance measured along the optical center axis MA.1, MA.2 also changes abruptly. Also in this case, the distance that was last measured before the event was detected is used. It is also possible that the contour of the object between the illumination unit 1, 2 and the surface Ob is determined, and the area enclosed by this contour in the topographic profile is disregarded when the current distance $dist_1$, $dist_2$ is determined.

Preferably, the control unit 10 computationally projects the center axis MA.1, MA.2 into the topographic profile from the surface Ob generated by the camera 4.1, 4.2. The control unit 10 determines a mean distance between the illumination unit 1, 2 and the illuminated surface Ob in a region around the intersection S.1, S.2. In many cases, this average distance suitably takes into account unevenness of the surface Ob.

An indication of the deviation between the reference distance $dist_{Ref}$ and the respective measured current distance $dist_1$, $dist_2$ is output in a form that can be perceived by a human. In one embodiment, the respective measured distance $dist_1$, $dist_2$ or an indicator for a deviation are output continuously. In another embodiment, the indicator for the deviation is output when a user touches an actuation unit of the illumination unit 1, 2. This actuation unit is, for example, a handle 9.1, 9.2, which is attached to the bottom of the support 5.1, 5.2 and makes it easier for the user to position and orient the illumination unit 1, 2 in space. The actuation unit may also comprise a push button, a switch, a slider, a touch sensitive screen (touchscreen) or a similar suitable element. The deviation between the reference distance $dist_{Ref}$ and the respective measured current distance is $dist_1$, $dist_2$ output, in particular visually, acoustically and/or haptically, and preferably by means of an output unit attached to the illumination device 1, 2 itself. The visual output is described in more detail below. An acoustic output may include a sequence of tones, where the greater the deviation between the reference distance $dist_{Ref}$ and the measured distance $dist_1$, $dist_2$, the higher the frequency in one implementation and the lower the frequency in another implementation. In a haptic output, an actuating unit, for example the handle 9.1, 9.2 described above, vibrates, with the vibration frequency preferably being the higher or also the lower the greater is the deviation.

In a visual output, one of at least three different visual display elements is shown highlighted. These at least three different display elements are one embodiment of output elements according to the invention. For example, a green indicator element is shown highlighted when the deviation is within a given first tolerance range $Tol_1$ around zero, yellow when the deviation is outside the first tolerance range $Tol_1$ in a wider tolerance range $Tol_w$ around zero, and red when the deviation is even outside the wider tolerance range $Tol_w$.

Figure 3:
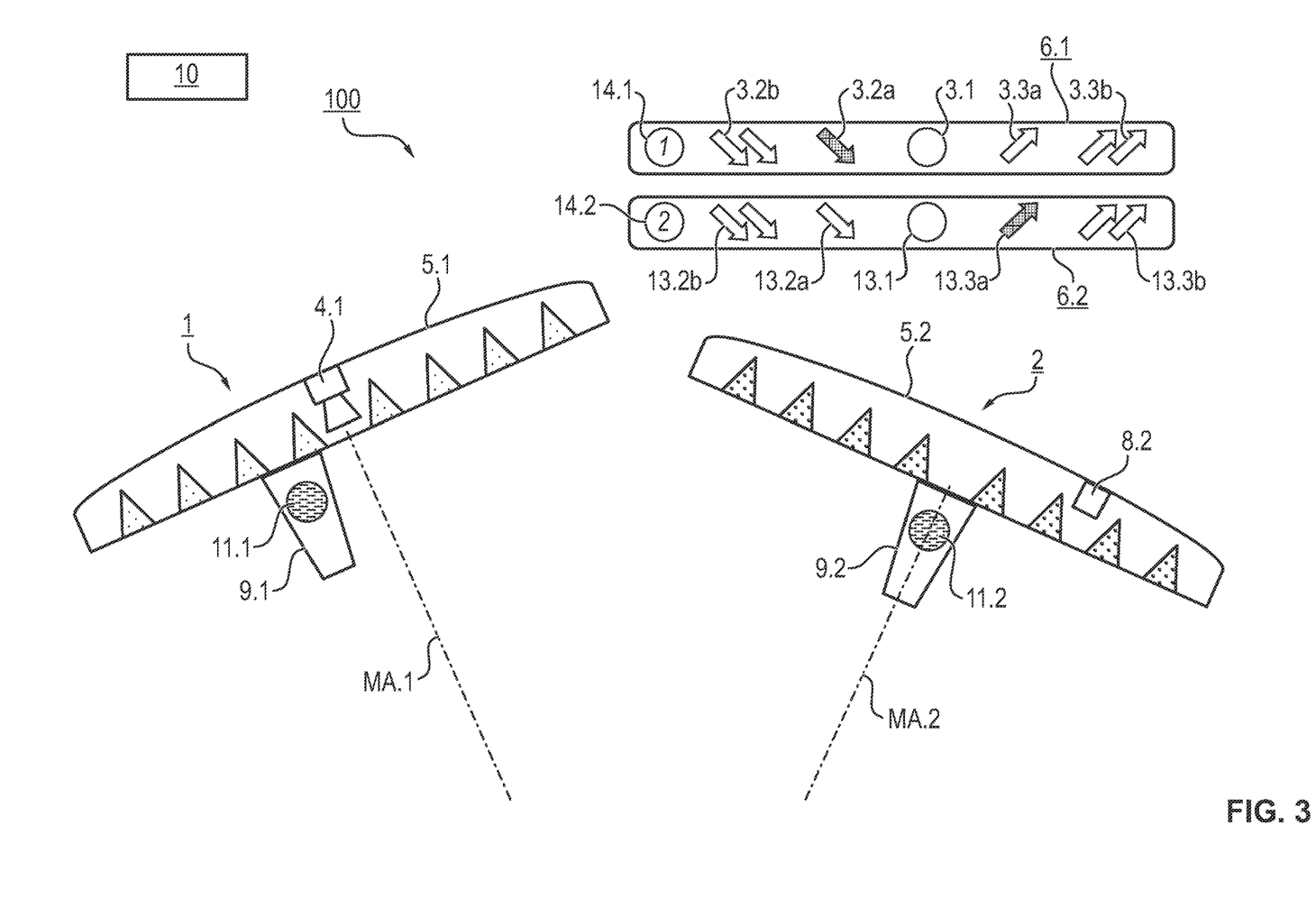
FIG. 3 is a schematic view showing two display units and two touch sensors for the two illumination devices of FIG. 1.

FIG. 3 shows another embodiment of a visual output. An output unit in the form of a display unit 6.1 is assigned to the illumination unit 1 and preferably attached to the support 5.1, another output unit in the form of a display unit 6.2 is assigned to the illumination unit 2 and preferably attached to the support 5.2. In one implementation, the additional display elements 14.1, 14.2 light up when a user touches the illumination unit 1 or 2. The display unit 6.1 comprises five display elements 3.1, 3.2, 3.3a, 3.3b, the display unit 6.2 comprises five display elements 13.1, 13.2, 13.3a, 13.3b. The circular display element 3.1, 13.1 in the center functions as the first output element and indicates that the deviation is in the tolerance range $Tol_1$ around zero. The arrow-shaped display elements 3.2a, 3.2b, 13.2a, 13.2b, 3.3a, 3.3b, 13.3a, 13.3b to the left and right of the circular display element 3.1, 13.1 each act as a second or as a third output element and indicate that the deviation is outside the first tolerance range $Tol_1$. The eight arrow-shaped indicator elements 3.2a, 3.2b, 13.2a, 13.2b, 3.3a, 3.3b, 13.3a, 13.3b also indicate the direction in which the illumination unit 1, 2 must be moved so that the actual distance does not differ from the reference distance $dist_{Ref}$ by more than the first tolerance range $Tol_1$. Thus, a single or double arrow 3.2a, 3.2b, 13.2a, 13.2b from top left to bottom right indicates that the distance must be decreased, a single or double arrow 3.3a, 3.3b, 13.3a, 13.3b from bottom left to top right indicates that the distance must be increased. A single arrow 3.2a, 13.2a, 3.3a, 13.3a indicates that the distance is slightly too large or slightly too small, respectively, a double arrow 3.2b, 13.2b, 3.3b, 13.3b indicates that the distance is considerably too large or considerably too small, respectively. More precisely, the double arrow 3.2b, 13.2b, 3.3b, 13.3b indicates that the distance is even outside a predetermined further tolerance range $Tol_w$, which includes the first tolerance range $Tol_1$. The single arrow 3.2a, 13.2a, 3.3a, 13.3a indicates that the distance is outside the first tolerance range $Tol_1$ but still within the further tolerance range $Tol_w$. In the example of FIG. 3, a simple arrow 3.2a from top left to bottom right is shown highlighted on the display unit 6.1 and a simple arrow 13.3a from bottom left to top right is shown filled in black on the display unit 6.2.

FIG. 1 and FIG. 3 also each show a handle 9.1, which is mechanically connected to the support 5.1 of the first illumination unit 1, and a handle 9.2, which is mechanically connected to the support 5.2 of the second illumination unit 2. With the handle 9.1, 9.2, the illumination unit 1, 2 can be moved in space and thereby positioned and oriented.

A touch sensor 11.1 is integrated in the handle 9.1, and a touch sensor 11.2 is integrated in the handle 9.2. The touch sensor 11.1 detects the event that a user has touched the handle 9.1. The touch sensor 11.2 detects the event that a user has touched the handle 9.2. The event that a touch of the handle 9.1 has been detected triggers the step of outputting the measured current distance $dist_1$ between the first illumination unit 1 and the illuminated surface Ob in a form perceptible by a human, for example as just described on the display unit 6.1. Accordingly, the event that a touch of the handle 9.2 has been detected triggers the step of outputting the measured current distance $dist_2$ between the second illumination unit 2 and the illuminated surface Ob. Furthermore, the event of touching a touch sensor 11.1, 11.2 triggers the step of illuminating or otherwise highlighting the corresponding display element 14.1, 14.2 on the display unit 6.1, 6.2.

It is also possible that the deviation between the measured distance $dist_1$, $dist_2$ and the reference distance $dist_{Ref}$ is visually displayed in another way. For example, an indicator light flickers according to the deviation, changes its diameter or light spectrum depending on the deviation, or shows a pattern that depends on the deviation, such as a running light.

Figure 6:
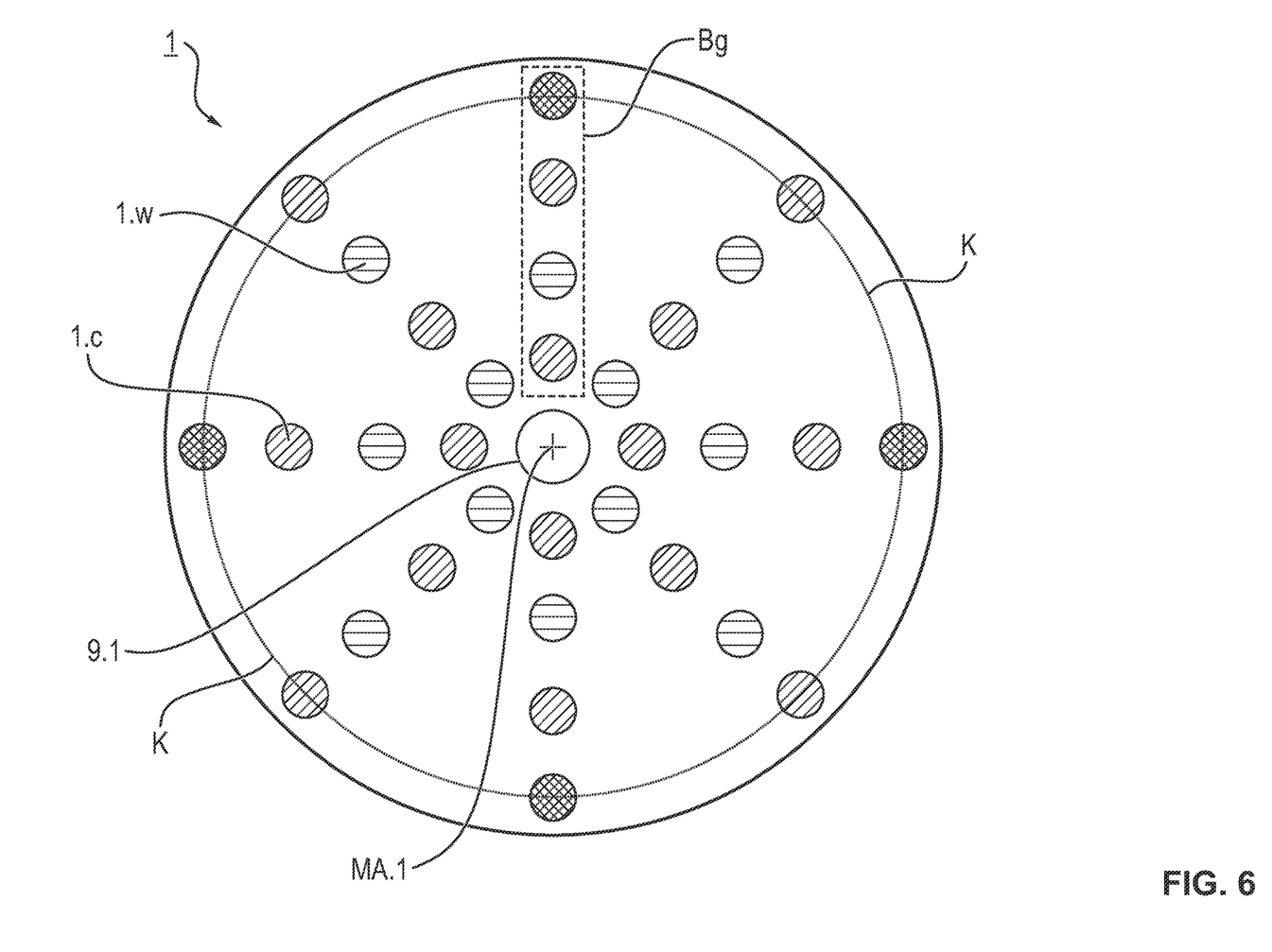
FIG. 6 is a schematic view showing how an indication of the deviation is output by flashing light sources.

FIG. 6 illustrates an example of another embodiment including an output unit to visually output an indication for the deviation between the measured distance $dist_1$, $dist_2$ and the reference distance $dist_{Ref}$. Some light sources of the first illumination unit 1 also function as the output unit in another form of a display unit. FIG. 6 shows the illumination unit 1, wherein the optical center axis MA.1 is perpendicular to the drawing plane and the viewer looks at the illumination unit 1 from the direction of the illuminated surface Ob. In the example shown, the illumination unit 1 comprises eight assemblies each having four light sources, the four light sources being arranged in a row. As an example, the assembly Bg is marked. Each assembly consists of two light sources 1.w, which emit warm white light, and two light sources 1.c, which emit cool white light. In FIG. 6, the warm white light sources 1.w are shown hatched differently than the cool white light sources 1.c. The warm white light sources 1.w and the cool white light sources 1.c are arranged alternately. The eight assemblies are arranged radially around the center optical axis MA. In addition, the light sources 1.w, 1.c are arranged on four concentric circles around the optical center axis.

As long as the deviation is in a tolerance range $Tol_1$ or $Tol_w$ around zero, all light sources appear to a human observer as continuously illuminated. It is possible that the light sources 1.w, 1.c are operated in pulsed mode, i.e. that a pulsed electrical voltage is applied to the light sources 1.w, 1.c, such as LEDs. However, the pulse frequency is such that a user does not perceive any flickering. If, on the other hand, the deviation is outside the tolerance range $Tol_1$, $Tol_w$, some light sources are supplied with electrical energy in such a way that they flicker in a way that can be perceived by a human. The frequency of the flickering can be higher the further the deviation is from the tolerance range $Tol_1$, $Tol_w$. In FIG. 6, four light sources on the outermost circle K are represented by four black circles as an example. If the deviation is outside the tolerance range $Tol_1$, $Tol_w$, these four light sources flicker.

While specific embodiments of the invention have been shown and described in detail to illustrate the application of the principles of the invention, it will be understood that the invention may be embodied otherwise without departing from such principles.

List of reference characters

| | |
|---|---|
| 1 | First illumination unit, comprises the light sources 1.1, 1.2, . . . , the support 5.1 with the handle 9.1 and the camera 4.1, has the optical center axis MA.1 |
| 1.1, 1.2, . . . | Light sources of the first illumination unit 1, generate the light beams $Lb_{1.1}$, $Lb_{1.2}$, . . . , are mounted on the support 5.1 |
| 1.c | Cool white light source of the first illumination unit 1 |
| 1.w | Warm white light source of the first illumination unit 1 |
| 2 | Second illumination unit, comprises the light sources 2.1, 2.2, . . . , the support 5.2 with the handle 9.2 and the distance sensor 8.2 or the camera 4.2, has the optical center axis MA.2 |
| 2.1, 2.2, . . . | Light sources of the second illumination unit 2, generate the light beams $Lb_{2.1}$, $Lb_{2.2}$, . . . , are mounted on the support 5.2 |
| 3.1 | First display element on the display unit 6.1 |
| 3.2a, 3.2b | Second display elements on the display unit 6.1 |
| 3.3a, 3.3b | Second display elements on the display unit 6.1 |
| 4.1 | Camera of the first illumination device 1, centered mounted on the support 5.1, has the field of view Bf.1, is able to measure the distance $dist_1$ between itself and the surface Ob and, in one embodiment, to yield a signal for generating a topographic profile of the surface Ob |
| 4.2 | Camera of the second illumination device 2, mounted on the support 5.2, has the field of view Bf.2, is able to measure the distance $dist_2$ between itself and the surface Ob and, in one embodiment, to yield a signal for generating a topographic profile of the surface Ob |
| 5.1 | Support of the first illumination device 1, includes the handle 9.1, carries the light sources 1.1, 1.2, . . . |
| 5.2 | Support of the second illumination device 2, includes the handle 9.2, carries the light sources 2.1, 2.2, . . . |
| 6.1 | Display unit referring to the first illumination unit 1 comprises the display elements 3.1, 3.2, 3.3a, 3.3b |
| 6.2 | Display unit referring to the second illumination unit 2 comprises the display elements 13.1, 13.2, 13.3a, 13.3b |
| 7.1, 7.2, . . . | Elevations on the object Obj |
| 8.2 | Distance sensor of the second illumination device 2, mounted on the support 5.2 with the lateral offset $dist_{lat}$, is able to measure the distance $dist_2$ between itself and the surface Ob |

List of reference characters -continued

| | |
|---|---|
| 9.1 | Handle on the support 5.1, can be used to position the first illumination unit 1, comprises the touch sensor 11.1 |
| 9.2 | Handle on the support 5.2, can be used for positioning the second illumination unit 2, comprises the touch sensor 11.2 |
| 10 | Signal processing control unit, receives signals from the sensors 4.1, 4.2, 8.2, 11.1, 11.2, controls the display units 6.1 and 6.2 |
| 11.1 | Touch sensor on the handle 9.1, detects a touch of the handle 9.1 |
| 11.2 | Touch sensor on the handle 9.2, detects a touch of the handle 9.2 |
| 13.1 | First display element of the display unit 6.2 |
| 13.2a, 13.2b | Second display elements of the display unit 6.2 |
| 13.3a, 13.3b | Third display elements of the display unit 6.2 |
| 14.1, 14.2 | Display elements on the display unit 6.1, 6.2, indicate that the assigned illumination unit 1, 2 is being touched |
| 100 | Illumination device, comprising the illumination units 1 and 2, the display units 6.1 and 6.2, and the control unit 10, is capable of illuminating the surface Ob of the object Obj |
| Bf.1 | View field of the camera 4.1 |
| Bf.2 | View field of the camera 4.2 |
| Bg | Assembly of the first illumination unit 1, includes four light sources 1.w, 1.c |
| $dist_1$ | Current distance between the first illumination unit 1 and the illuminated surface, measured by the camera 4.1 |
| $dist_2$ | Current distance between the first illumination unit 1 and the illuminated surface, measured by the distance sensor 8.2 |
| $dist_{lat}$ | Lateral offset between the distance sensor 8.2 and the optical center axis MA.2 |
| $dist_{Ref}$ | given reference distance between and illumination unit and an illuminated surface, is 1 m, e.g. |
| Δ | deviation between the measured distance $dist_1$ and the given reference distance $dist_{Ref}$ |
| K | Circle around the optical center axis MA, on which eight light sources of the first illumination unit 1 are arranged, four of these light sources flickering when the deviation is outside the tolerance range around zero |
| $Lb_{1.1}$, $Lb_{1.2}$, . . . | Light beams which generate the light sources 1.1, 1.2, . . . |
| $Lb_{2.1}$, $Lb_{2.2}$, . . . | Light beams generated by the light sources 2.1, 2.2, . . . |
| MA.1 | Optical and geometrical center axis of the first illumination unit 1 |
| MA.2 | Optical and geometrical center axis of the second illumination unit 2 |
| Ob | Illuminated surface of the object obj, here: of the patient on the operating table |
| Obj | Illuminated object, here: patient on the operating table |
| $Ref_1$ | Point on the optical center axis MA.1 where the illumination unit 1 would be if it were positioned at the reference distance $dist_{Ref}$ from the surface Ob |
| $Ref_2$ | Point on the optical center axis MA.2 where the illumination unit 2 would be if it were positioned at the reference distance $dist_{Ref}$ from the surface Ob |
| S.1 | Intersection of the center axis MA.1 with the surface Ob |
| S.2 | Intersection of the center axis MA.2 with the surface Ob |
| $Tol_1$ | first, narrower tolerance range around Zero |
| $Tol_w$ | further, wider tolerance range, comprises and surrounds the first tolerance range $Tol_1$ |

What is claimed is:

1. An illumination device comprising:
   an illumination unit configured to illuminate a surface, wherein a position and orientation of the illumination unit relative to the surface is variable;
   a distance sensor associated with the illumination unit, wherein the distance sensor is configured to measure an indicator of a current distance between the associated illumination unit and the surface;
   an output unit associated with the illumination unit; and
   a signal processing control unit configured to control the output unit based on the indicator of the current distance and on a given reference distance between the illumination unit and the surface, wherein the controlled output unit is configured to output an indication in a form that can be perceived by a human, and wherein the indication relates to how much the measured distance between the illumination unit and the surface deviates from the given reference distance.

2. An illumination device according to claim 1, wherein the output unit comprises
a first output element;
a second output element; and
a third output element,
wherein the controlled output unit is configured to:
highlight the first output element if the difference between the measured current distance and the given reference distance is within a given tolerance range around zero;
highlight the second output element if the difference is greater than an upper threshold of the tolerance range; and
highlight the third output element if the difference is smaller than a lower threshold of the tolerance range.

3. An illumination device according to claim 2, wherein the illumination device comprises a first illumination unit and a second illumination unit;
the first illumination unit is configured to generate a greater maximal irradiance than the second illumination unit; and
a given tolerance range for the first illumination unit is smaller than a given tolerance range for the second illumination unit.

4. An illumination device according to claim 1, wherein the output unit comprises:
a first output element;
two second output elements; and
two third output elements,
wherein the controlled output unit is configured to
highlight the first output element if the difference between the measured current distance and the given reference distance is within a predetermined first tolerance range around zero;
if the difference is greater than an upper threshold of the first tolerance range, highlight one of the second output elements and additionally or instead highlight another one of the second output elements if the difference is even increasing, highlight another of the second output elements if the difference is decreasing and highlight another one of the second output elements if the difference is even greater than an upper threshold of a given further wider tolerance range comprising the first tolerance range; and
if the difference is smaller than the lower threshold of the first tolerance range, highlight one third output element and additionally or instead highlight another of the third output elements if the difference is even decreasing, highlight another of the third output elements if the difference between the measured distance and the reference distance is increasing and highlight another of the third output elements if the difference between the measured distance and the reference distance is even smaller than the lower threshold of the wider tolerance range.

5. An illumination device according to claim 1, further comprising another illumination unit and another output unit associated with the other illumination unit, wherein:
the position and orientation of each illumination unit relative to each other illumination unit is variable; and
the output unit is mechanically connected to the illumination unit such that the position and orientation of the associated output unit relative to the illumination unit is fixed; and
the other output unit is mechanically connected to the other illumination unit such that the position and orientation of the associated other output unit relative to the other illumination unit is fixed.

6. An illumination device according to claim 1, wherein:
the distance sensor is configured to scan the surface without contact and to generate a topographic profile of the surface using results of the scan; and
the control unit is configured to determine the indicator of the distance between the illumination unit and the surface using the generated topographic profile.

7. An illumination device according to claim 1, wherein:
the illumination unit comprises a handle;
the output unit is integrated in the handle, and
the controlled output unit in the handle is configured to output the indication by vibration.

8. An illumination device according to claim 1, wherein:
the illumination unit comprises a plurality of light sources; and
the output unit is configured to visually output the indication for the deviation between the measured distance and the reference distance using at least one light source of the plurality of light sources.

9. An illumination device according to claim 8, wherein:
the output unit is configured to transfer at least one light source of the plurality of light sources from a first state to a second state, if the distance between the illumination unit and the surface measured at a first time lies within a predetermined tolerance range around the reference distance and the distance measured at a subsequent second time lies outside the reference distance;
both the first state and the second state are visually perceptible by a human; and
a visual perception of the second state is different from a visual perception of the first state.

10. An illumination device according to claim 9, wherein the light source being in the first state appears to a human as continuously luminous and being in the second state as flashing, or the light source of the plurality of light sources flashes in the second state with a higher frequency perceptible by a human than in the first state, or a maximum illuminance or a light field diameter or a light spectrum of the light source being in the second state is different from that with the light source being in the first state.

11. An illumination device according to claim 1, further comprising a sensor configured to detect an activating event, wherein:
the activating event comprises at least one of:
the illumination device is moved or touched;
the illuminated surface is moved;
an actuating element of the illumination device is actuated; and
the deviation between the measured distance and the reference distance is above a predetermined deviation tolerance range and/or a change in deviation between the measured distance and the reference distance is above a predetermined change tolerance range;
the control unit is arranged to control the output unit in response to the detection of the activating event such that the controlled output unit outputs the indication; and the control unit is further configured, if no further activating event has been detected within a specified time period after the detection of the activating event, to control the output unit such that the controlled output unit terminates the output of the indication.

12. An illumination process for illuminating a surface, the process comprising the steps of:
providing an illumination device comprising an illumination unit, a distance sensor associated with the illumination unit, and an output unit associated with the illumination unit;
illuminating the surface with the illumination device; and
changing a position and/or an orientation of the illumination unit relative to the surface,
wherein after changing the position and/or the orientation of the illumination unit, triggering and performing a sequence, wherein the sequence comprises:
with the distance sensor, measuring an indication of a current distance between the associated illumination unit and the surface;
controlling the output unit of the illumination unit such that the controlled output unit outputs an indication in a form perceptible by a human, wherein the indication indicates how much the measured current distance between the illumination unit and the surface deviates from a given reference distance, and
wherein the sequence is triggered at least when at least one of:
the illumination device is moved or touched;
the illuminated surface is moved;
an actuating element of the illumination device is actuated; and
a position and/or orientation deviation outside a predetermined deviation tolerance range and/or a change in deviation outside a predetermined change tolerance range is detected.

13. An illumination process according to claim 12, wherein:
the output unit comprises:
a first output element;
a second output element; and
a third output element; and
the step that this output unit outputs the indication comprises the controlled output unit steps of:
highlighting the first output element when the difference between the measured current distance and the given reference distance is within a predetermined tolerance range around zero,
highlighting the second output element when the difference is greater than the upper threshold of the tolerance range, and
highlighting the third output element if the difference is smaller than the lower threshold of the tolerance range.

14. An illumination process according to claim 12, wherein:
the output unit comprises:
a first output element;
two second output elements; and
two third output elements; and
the controlled output unit:
highlights the first output element if the difference between the measured current distance and the given reference distance is within a predetermined first tolerance range around zero;
if the difference is greater than the upper threshold of the tolerance range, highlights one of the second output elements and additionally or instead highlights another of the second output elements if the difference is even increasing, highlights another of the second output elements if the difference decreases, and highlights another of the second output elements if the difference is even greater than an upper threshold of a given further wider tolerance range comprising the first tolerance range; and
if the difference is smaller than the lower threshold of the tolerance range, highlights one of the third output elements and
additionally or instead highlights another of the third output elements if the difference is even decreasing, highlights another of the third output elements if the difference is increasing and highlights another of the third output elements if the difference is even smaller than the lower threshold of the wider tolerance range.

* * * * *